United States Patent
Cao et al.

(10) Patent No.: US 11,359,268 B2
(45) Date of Patent: Jun. 14, 2022

(54) IRON BASED ALLOY SUITABLE FOR PROVIDING A HARD AND WEAR RESISTANT COATING ON A SUBSTRATE, ARTICLE HAVING A HARD AND WEAR RESISTANT COATING, AND METHOD FOR ITS MANUFACTURE

(71) Applicant: Höganäs AB (Publ), Höganäs (SE)

(72) Inventors: Cecilia Cao, Hubei (CN); Crystal Liu, Shanghai (CN); Kari Vesterling, Shanghai (CN); Erik Wang, Shanghai (CN); Hans Hallén, Taiwan (CN)

(73) Assignee: HÖGANÄS GERMANY GMBH, Goslar (DE)

( * ) Notice: Subject to any disclaimer, the term of this patent is extended or adjusted under 35 U.S.C. 154(b) by 0 days.

(21) Appl. No.: 16/622,961

(22) PCT Filed: Jun. 21, 2017

(86) PCT No.: PCT/CN2017/089327
§ 371 (c)(1),
(2) Date: Dec. 16, 2019

(87) PCT Pub. No.: WO2018/232619
PCT Pub. Date: Dec. 27, 2018

(65) Prior Publication Data
US 2021/0147967 A1 May 20, 2021

(51) Int. Cl.
*C22C 38/56* (2006.01)
*C22C 38/54* (2006.01)
(Continued)

(52) U.S. Cl.
CPC .............. *C22C 38/56* (2013.01); *B32B 15/01* (2013.01); *B32B 15/011* (2013.01); *B32B 15/012* (2013.01); *B32B 15/013* (2013.01); *B32B 15/04* (2013.01); *B32B 15/043* (2013.01); *B32B 15/18* (2013.01); *C22C 33/02* (2013.01); *C22C 33/0264* (2013.01); *C22C 33/0278* (2013.01); *C22C 38/02* (2013.01); *C22C 38/04* (2013.01); *C22C 38/08* (2013.01); *C22C 38/12* (2013.01); *C22C 38/18* (2013.01); *C22C 38/22* (2013.01); *C22C 38/24* (2013.01); *C22C 38/32* (2013.01); *C22C 38/36* (2013.01); *C22C 38/40* (2013.01); *C22C 38/44* (2013.01); *C22C 38/46* (2013.01); *C22C 38/54* (2013.01); *C23C 4/04* (2013.01); *C23C 4/06* (2013.01); *C23C 30/00* (2013.01); *C23C 30/005* (2013.01); *B22F 1/05* (2022.01); *B22F 3/115* (2013.01); *B22F 7/08* (2013.01); *B22F 2003/242* (2013.01); *B22F 2202/13* (2013.01); *B22F 2998/10* (2013.01);
(Continued)

(58) Field of Classification Search
CPC ......... C22C 38/56; C22C 38/36; C22C 38/22; C22C 38/24; C22C 38/32; C22C 38/02; C22C 38/04; C22C 38/44; C22C 38/46; C22C 38/54; C22C 38/08; C22C 38/12; C22C 38/18; C22C 38/40; C22C 33/0285; C22C 33/0257; C22C 33/0271; C22C 33/0264; C22C 33/0278; C22C 33/02; B32B 15/01; B32B 15/011; B32B 15/012; B32B 15/013; B32B 15/04; B32B 15/043; B32B 15/18; C23C 30/00; C23C 30/005; C23C 4/04; C23C 4/06; B22F 2003/242; B22F 2999/00; B22F 2998/10; B22F 3/115; B22F 2202/13; B22F 7/08; B22F 1/0011; B22F 1/05; Y10T 428/12951; Y10T 428/12958; Y10T 428/12965; Y10T 428/12972; Y10T 428/12979; Y10T 428/12993; Y10T 428/26
See application file for complete search history.

(56) References Cited

U.S. PATENT DOCUMENTS

| 5,643,531 A | 7/1997 | Kim et al. |
| 5,720,830 A * | 2/1998 | Wragg ............... B22F 1/025 |
| | | 148/326 |

(Continued)

FOREIGN PATENT DOCUMENTS

| CN | 101974724 A | 2/2011 |
| CN | 105862032 A | 8/2016 |

(Continued)

OTHER PUBLICATIONS

Machine Translation, Hitachi, JP S57108247A, Jul. 1982. (Year: 1982).*

(Continued)

Primary Examiner — Michael E. La Villa
(74) Attorney, Agent, or Firm — Buchanan Ingersoll & Rooney P.C.

(57) ABSTRACT

The present invention relates to an iron-based alloy that is able to provide a coating on a substrate, the coating having simultaneously high hardness and wear resistance. The iron-based alloy consists of 3.0-7.0% by weight Cr; 1.3-3.0% by weight C; 0.2-2.0% by weight B; 2.0-10.0% by weight V; optionally 1.5% by weight or less Si; optionally 1.0% by weight or less Mn, optionally 2.0% by weight or less Mo; optionally 1.5% by weight or less Ni; the balance being Fe and unavoidable impurities.

The present invention further relates to an article comprising a substrate and coating formed thereon, the coating being formed from the alloy, and to a method for forming a coated article. The method preferably employs HVOF, laser cladding or plasma cladding.

22 Claims, No Drawings

(51) Int. Cl.

| | | |
|---|---|---|
| *C22C 38/44* | (2006.01) | |
| *C22C 38/46* | (2006.01) | |
| *C22C 38/02* | (2006.01) | |
| *C22C 38/04* | (2006.01) | |
| *B32B 15/01* | (2006.01) | |
| *C23C 30/00* | (2006.01) | |
| *C22C 38/36* | (2006.01) | |
| *C22C 38/22* | (2006.01) | |
| *C22C 38/24* | (2006.01) | |
| *C22C 38/32* | (2006.01) | |
| *B32B 15/04* | (2006.01) | |
| *C22C 38/18* | (2006.01) | |
| *C22C 38/40* | (2006.01) | |
| *C22C 33/02* | (2006.01) | |
| *C22C 38/12* | (2006.01) | |
| *C22C 38/08* | (2006.01) | |
| *B32B 15/18* | (2006.01) | |
| *C23C 4/04* | (2006.01) | |
| *C23C 4/06* | (2016.01) | |
| *B22F 3/24* | (2006.01) | |
| *B22F 3/115* | (2006.01) | |
| *B22F 7/08* | (2006.01) | |
| *B22F 1/05* | (2022.01) | |

(52) U.S. Cl.
CPC ...... *B22F 2999/00* (2013.01); *C22C 33/0257* (2013.01); *C22C 33/0271* (2013.01); *C22C 33/0285* (2013.01); *Y10T 428/12951* (2015.01); *Y10T 428/12958* (2015.01); *Y10T 428/12965* (2015.01); *Y10T 428/12972* (2015.01); *Y10T 428/12979* (2015.01); *Y10T 428/12993* (2015.01); *Y10T 428/26* (2015.01)

(56) References Cited

U.S. PATENT DOCUMENTS

| | | |
|---|---|---|
| 2013/0157081 A1 | 6/2013 | Liu et al. |
| 2015/0307968 A1 | 10/2015 | Mars et al. |
| 2016/0193637 A1 | 7/2016 | Oda et al. |
| 2017/0165794 A1 | 6/2017 | Diekevers et al. |

FOREIGN PATENT DOCUMENTS

| | | |
|---|---|---|
| CN | 106480450 A | 3/2017 |
| DE | 3508982 C2 | 3/1990 |
| DE | 19901170 B4 | 11/2006 |
| EP | 1558416 A1 | 8/2005 |
| EP | 3050638 A1 | 8/2016 |
| JP | S57108246 A | 7/1982 |
| JP | S57108247 A | 7/1982 |
| JP | S 59-85847 A | 5/1984 |
| JP | S60035983 | 8/1985 |
| JP | H02-88756 A | 3/1990 |
| JP | H04141553 A | 5/1992 |
| JP | H07-278756 A | 10/1995 |
| JP | 2006-152381 A | 6/2006 |
| JP | 2016-509126 A | 3/2016 |
| KR | 10-2016-0060061 A | 5/2016 |
| WO | 2004/035250 A1 | 4/2004 |
| WO | 2015045720 A1 | 4/2015 |

OTHER PUBLICATIONS

Machine Translation, Hattori et al., JP 04-141553, May 1992. (Year: 1992).*
Translation, Saka et al., JP 60035983 B2, Aug. 1985. (Year: 1985).*
International Search Report (PCT/ISA/210) dated Feb. 24, 2018, by the Chinese Patent Office as the International Searching Authority for International Application No. PCT/CN2017/089327.
Written Opinion (PCT/ISA/237) dated Feb. 24, 2018, by the Chinese Patent Office as the International Searching Authority for International Application No. PCT/CN2017/089327.
Office Action (Notice of Reasons for Refusal) dated May 31, 2021, by the Japanese Patent Office in corresponding Japanese Patent Application No. 2019-570900, and an English Translation of the Office Action. (8 pages).
Office Action dated Jul. 29, 2021, by the Federal Public Service Ministry of Economy National Institute of Industrial Property in Brazilian Patent Application No. BR112019026489-2 and an English Translation of the Office Action. (5 pages).
Office Action (Notification of Reason for Refusal) dated Oct. 15, 2021, by the Intellectual Property Office in corresponding Korean Patent Application No. 10-2020-7001911, and an English Translation of the Office Action. (15 pages).

* cited by examiner

IRON BASED ALLOY SUITABLE FOR PROVIDING A HARD AND WEAR RESISTANT COATING ON A SUBSTRATE, ARTICLE HAVING A HARD AND WEAR RESISTANT COATING, AND METHOD FOR ITS MANUFACTURE

FIELD OF THE INVENTION

The present invention generally belongs to the field of iron-based alloys, in particular those having hardness, wear resistance as well as suitable corrosion resistance. The present invention furthermore belongs to the field of articles having a hard and wear resistant coating made from an iron based alloy, and to methods for the manufacture of such articles using the iron-based alloy of the present invention.

BACKGROUND OF THE INVENTION

Iron-based alloys such as various types of steel are used in a multitude of applications, but sometimes lack as such the required properties. As one example, a steel material may not be sufficiently hard and wear resistant to withstand harsh conditions during use, as observed in e.g. drilling and mining machines.

Wear stands for major waste and costs in society, and improving the wear resistance of metal surfaces with both give major savings and will also contribute to environmental friendliness.

Various methods have previously been used in order to provide wear resistant surfaces. For example, hard chromium plating has been used to provide protective coatings on machinery that is exposed to harsh conditions and wear, such as in mining applications or tunnel drilling machines. Such chromium coatings have been commonly used for obtaining coatings having bright appearance, high wear and corrosion resistance. Aerospace, oil&gas and heavy industrial equipment, such as mining equipment, are the major end industries for these coatings.

A hard chromium coating is typically formed on a conductive, typically metallic, substrate by electrodeposition of chromium from aqueous solution containing chromium ions. The application of hard chromium coating has however decreased due to stricter environmental legislations regarding hexavalent chromium, $Cr^{VI}$ used in the process or being contained in waste resulting therefrom.

Due to its formation by electrodeposition, in this way hard chromium platings can only be provided on electrically conductive substrate surfaces. Further, the manufacture of a coating by electrodeposition can be energy intensive, and can further lead to problems in cases where complex structures are to be formed. Further, electrodeposition processes are generally only able to provide a coating layer of uniform thickness on all parts of the substrate emerged into an electrolytic coating, and are thus unable to provide a coating in varying thicknesses and/or only on selected parts of a substrate.

In view of these problems and limitations, the search for a replacement of hard chrome plating started almost 30 years ago. Thermal spray methods such as HVAF (High Velocity Oxy-fuel coating spraying), plasma transferred wire arc (PTWA) or plasma powder spraying have replaced several hard chrome plating applications, for examples for aircraft landing gear and hydraulic cylinders.

The main requirements for coatings that shall replace hard chrome plating include good corrosion, wear resistance and sufficient bond strength. The latter may be a metallurgical bonding between substrate material and coating, which is best achieved with a minimal heat input in order to avoid deterioration of the substrate and/or the coating.

Laser cladding is a well-established process that may generally be set up to meet these requirements. Laser cladding might thus be an alternative to hard chrome plating for many applications, as it could allow applying thin corrosion and wear resistant deposits with minimal impact on the substrate material.

A material used for coatings is M2 steel. M2 steel has the following composition (in weight-%):

| | |
|---|---|
| Carbon (C) | 0.78-1.05 |
| Chromium (Cr) | 3.75-4.5 |
| Iron (Fe) | Balance |
| Manganese (Mn) | 0.15-0.4 |
| Molybdenum (Mo) | 4.5-5.5 |
| Phosphorus (P) | 0.03 max |
| Silicon (Si) | 0.2-0.45 |
| Sulphur (S) | 0.03 max |
| Tungsten (W) | 5.5-6.75 |
| Vanadium (V) | 1.75-2.2 |

With M2 being one example, many of the alloys for surface cladding originate from conventional steel production as tool steels and high speed steels. These materials were developed to fit the production processes in steel making, but for metal powders used for surface coating, many of the manufacturing limitations are no relevant or do not apply.

High speed steel powders are often used to increase the wear resistance at elevated temperatures. In applications where high temperatures are not encountered, such materials unnecessarily consume limited raw materials, such as W and Co. M2 steel is also highly alloyed, containing at least 3.75% Cr, 0.15% Mn, 4.5% Mo, 5.5% W and 1.75% V, thus requiring at least 15.65% by weight of more expensive metals other than iron.

The materials used previously in coating deposition processes, such as M2, were unable to simultaneously reach high hardness and good wear resistance. Further, they required large amounts of alloying metals other than Fe, and could thus only be produced with high environmental load.

Known in the art of steelmaking are also V-alloyed tool steel. This material is however not adapted for thermal spraying processes or cladding processes. In fact, when used in thermal spraying or cladding processes, both V-alloyed tool steel and M2 have the tendency to produce a porous structure. Further, a coating employing commonly used M2 tool steel powder gives only a moderate wear resistance of 60 mm³ (determined according to ASTM G65) at a hardness of 63 HRC.

Problems to be Solved by the Invention

The present invention aims at providing a material able to form a protective coating having simultaneously high hardness, high wear resistance and sufficient corrosion resistance. The material should also have high ductility, and should be able to provide a less porous or non-porous coating by e.g. laser cladding.

The coating material should also be available at reasonable costs, should not rely on expensive materials, and should be producible with reduced environmental load, and should be adapted for existing processes such as laser cladding, plasma transferred arc cladding, or thermal spraying such as HVOF.

Further problems to be solved by the present invention will also become apparent in view of the following description.

SUMMARY OF THE INVENTION

In view of the problems defined above, the present invention provides the following:
1. An iron-based alloy, consisting of
   3.0-7.0% by weight Cr;
   1.3-3.0% by weight C;
   0.2-2.0% by weight B;
   2.0-10.0% by weight V;
   optionally 1.5% by weight or less Si;
   optionally 1.0% by weight or less Mn,
   optionally 2.0% by weight or less Mo;
   optionally 1.5% by weight or less Ni;
   the balance being Fe and unavoidable impurities.
2. The iron-based alloy according to aspect 1, wherein the content of Cr is from 3.2-6.8% by weight.
3. The iron-based alloy according to aspect 1 or aspect 2, wherein the content of B is from 0.2-1.2% by weight.
4. The iron-based alloy according to any one of aspects 1 to 3, wherein the content of Ni is greater than 0, and is preferably 1.0% by weight or less.
5. The iron-based alloy according to any one of aspects 1 to 4, wherein the content of Mo is greater than 0, and is preferably 0.8% by weight or less.
6. The iron-based alloy according to any one of aspects 1 to 5, wherein the content of V is from 4.0 to 8.0% by weight.
7. The iron-based alloy according to any one of aspects 1 to 6, wherein the content of C is from 1.5-2.8% by weight.
8. The iron-based alloy according to any one of aspects 1 to 7, wherein the content of the optional components Si, Mn, Mo and Ni is each 1.0% by weight or less.
9. The iron-based alloy according to any one of aspects 1-8, which is in powder form.
10. The iron-based alloy according to aspect 9, wherein the powder contains no or less than 2% by weight of particles having a particle size exceeding 250 μm as measured by sieve analysis according to ASTM B214-16.
11. The iron-based alloy in powder form according to any one of aspects 9 and 10, which consists of particles having a particle size between 5-200 μm or 20-200 μm as measured by sieve analysis according to ASTM B214-16.
12. An article having a substrate and a coating, the coating being formed from an iron-based alloy as defined in any one of aspects 1-11.
13. Article according to aspect 12, which is a hydraulic cylinder or roller used in the mining or steel industry.
14. The article according to aspect 13, wherein the coating has both
   a hardness of 60 HRC or greater as measured by SS-EN ISO 6508-1:2016; and
   a wear of 25 mm$^3$ or less according to ASTM G65-16, Procedure A.
15. The article according to any one of aspects 12 to 14, wherein the substrate is made of a metal or metal alloy, preferably steel, tool steel, or stainless steel.
16. The article according to any one of aspects 12 to 15, wherein the coating is formed by laser cladding, plasma powder cladding or plasma transfer arc, the iron-based alloy powder as defined in any one of aspects 8 to 10.
17. Use of the iron-based alloy according to any one of aspects 1 to 8 or the iron-based alloy powder according to any one of aspects 9 to 11 for forming a coating on a substrate.
18. A method for forming an coated article, comprising the steps of
   providing a substrate and
   forming a coating on the substrate
   wherein the coating is made of an alloy as defined in any one of aspects 1 to 8 and the step of forming the coating utilizes an alloy powder as defined in aspects 9 to 11.
19. The method for forming a coated article according to aspect 18, wherein the step of forming a coating is a laser cladding step, a plasma powder cladding step, a plasma transfer arc step or a HVOF step.
20. The method for forming a coated article according to aspect 18 or 19, wherein the article is defined as in any one of aspects 12 to 16.

DETAILED DESCRIPTION OF THE INVENTION

In the present invention, all parameters and product properties relate to those measured under standard conditions (25° C., 10$^5$ Pa) unless stated otherwise.

The term "comprising" is used in an open-ended manner and allows for the presence of additional components or steps. It however also includes the more restrictive meanings "consisting essentially of" and "consisting of".

Whenever a range is expressed as "from x to y", or the synonymous expression "x-y", the end points of the range (i.e. the value x and the value y) are included. The range is thus synonymous with the expression "x or higher, but y or lower".

The invention relates to an iron-based alloy as defined above and recited in claim 1. Herein, the term "iron-based" denotes that iron has the largest content (in weight-% of the total alloy) among all alloying elements. The content of iron will exceed 70% by weight, and will typically also exceed 75% by weight of the total weight of the alloy.

The alloy of the present invention consists of 3.0-7.0% by weight Cr; 1.3-3.0% by weight C; 0.2-2.0% by weight B; 2.0-10.0% by weight V; optionally 1.5% by weight or less Si; optionally 1.0% by weight or less Mn, optionally 2.0% by weight or less Mo; optionally 1.5% by weight or less Ni; the balance being Fe and unavoidable impurities.

Herein, the "unavoidable impurities" denote those components that originate from the manufacturing process of the alloy of which are contained as impurities in the starting materials. The amount of unavoidable impurities is generally 0.10% by weight or less, preferably 0.05% by weight or less, further preferably 0.02% by weight or less, most preferably 0.01% by weight or less. Typical impurities include P, O, S, and other impurities well known to a skilled person. Notably, while some of the elements recited in claim 1 may be regarded as impurities in other alloys, in the alloy of the present invention the elements recited above and in the claims are not encompassed by the term "unavoidable impurities", as they are intentionally added to the alloy of the present invention.

The alloy of the present invention can be manufactured by conventional methods well known to a person skilled in the art. For instance, it is possible to prepare the alloy of the present invention by mixing together powders of the metal elements in a suitable proportion and melting the mixture, followed by appropriate cooling.

The composition recited in claim 1 relates to the content of the respective alloying elements in weight %, as determined by Atomic Absorption Spectroscopy (AAS). Notably, the alloy composition as present in the final coating, as present on a substrate after using a suitable process such as laser cladding for forming a coating of the alloy of the invention, may differ slightly from the alloy composition defined in claim 1, which is the composition of the raw material powder employed during the coating formation step, e.g. in the laser cladding step or plasma powder cladding step. The reason for this is that elements originating from the environment (e.g. nitrogen or oxygen by laser cladding in air, or carbon or oxygen or nitrogen by plasma cladding using a hydrocarbon gas as fuel) may be incorporated to some extent into the coating.

The elements of the alloy will now be described with reference to their believed function and preferred amounts:

Chromium (Cr)

Chromium (Cr) is present in an amount of 3.0-7.0% by weight of the alloy.

Chromium serves to render the obtained coating to be sufficiently hard and corrosion-resistant. The lower limit of the amount of Cr is 3.0% by weight, but the amount of Cr can also be higher than 3.0% by weight, such as 3.5% by weight or higher. Preferably, Cr is contained in an amount of or 4.0% by weight or higher, more preferably 4.5% by weight or higher, such as 4.7% by weight or higher.

The upper limit is 7.0% by weight, by can also be less than 7.0% by weight, such as 6.5% by weight. The amount of Cr is preferably 6.0% by weight or less, such as 5.7% by weight or less. These upper and lower limits can be combined freely, so that the amount of Cr may be in the range of 3.5-6.5% by weight or 4.0-6.0% by weight.

Carbon (C)

Carbon unexpectedly achieves high hardness and wear resistance, in particular in combination with the required amounts of Cr and V.

The amount of carbon is 1.3-3.0% by weight.

The lower limit is 1.3% by weight, but can also be 1.4% by weight or higher, or 1.5% by weight or higher.

The upper limit of the carbon content is 3.0% by weight, but can also be 2.8% by weight or less or 2.7% by weight or less. Again, here and in all other instances, the upper and lower limits can be combined in any way, so that the amount of carbon may be e.g. from 1.4 to 2.7% by weight.

Boron (B)

Boron is present in an amount of 0.2-2.0% by weight. The lower limit is 0.2% by weight, but can also be higher than 0.20% by weight, such as 0.3% by weight. Preferably, the amount of boron is 0.5% by weight or more, such as 0.7% by weight or more.

The upper limit is 2.0% by weight, but can also be less than 2.0% by weight, such as 1.8% by weight or less, or 1.50% by weight or less. Preferably, the upper limit of the amount of B is 1.2% by weight or less, such as 1.0% by weight.

The presence of B decreases the liquidus temperature, typical by about 100° C., as compared to similar alloys without B. The lower melting point decreases the energy consumption for melting the alloy powder used in a coating process at its surface, and thus also decreases the HAZ (heat affected zone), which benefits product quality and allows substantially avoiding deterioration of the substrate and the alloy. B also increases the weldabilty of the alloy.

As a consequence, by including boron within the specified amount, the obtained coating becomes more robust with less variations of the chemical composition in the deposited coating, and the coating can be provided in an energy-efficient manner. Further, the borides formed during the solidification are an essential part of the invention to maintain the hardness of the coating.

Vanadium (V)

The alloy of the present invention contains 2.0-10.0% by weight V.

The lower limit of V is 2.0% by weight. The lower limit can however also be 3.0% by weight or 4.0% by weight.

The upper limit is 10.0% by weight, but can also be 8.0% by weight or less or 6.0% by weight or less, such as 5.7% by weight or less.

Optional Components

Si, Mn, Mo and Ni are optional components of the alloy of the present invention. These components may be completely absent, but the present invention also encompasses embodiments wherein one, two, three, or all four of them are present. For instance, Si and Mn may be present, while Mo and Ni are absent. As another Example, Si, Mn and Ni may be present, while Mo is absent.

Silicon (Si)

If silicon is present, its amount is 1.5% by weight or less, preferably 1.2% by weight or less, such as 1.0% by weight or less or 0.9% by weight or less.

As Si is optional, there is no specified lower limit. Yet, if Si is present, its amount can be 0.1% by weight or more, or 0.5% by weight or more, such as 0.7% by weight or more or 0.8% by weight or more.

Si is mainly added in order to avoid the formation of oxides of Fe and other alloying metals, as Si has a high affinity to oxygen. Adding Si is thus preferred in cases where the starting materials of the alloy contain oxygen or oxides, or where the manufacture of the alloy is conducted under oxygen-containing conditions.

Manganese (Mn)

If Mn is present, its amount is 1.0% by weight or less, preferably 0.8% by weight or less, more preferably 0.6% by weight or less, such as 0.5% by weight or less.

As Mn is optional, there is no specified lower limit. Yet, if Mn is present, its amount can be 0.1% by weight or more, or 0.2% by weight or more. An amount in the range of 0.3-0.5% by weight, such as 0.4% by weight, is also possible.

Molybdenum (Mo)

Mo is optionally present and may mainly serve to improve the corrosion resistance. Without wishing to be bound by theory, the alloying of Mo is believed to enhance the pitting corrosion resistance, the so-called PRE value.

In the alloy of the present invention, Mo can be contained in an amount of up to 2.0% by weight. The lower limit is not particularly limited, and can e.g. be 0.1% by weight or more, but can also be 0.2% by weight or more.

The upper limit is 2.0% by weight or less, but can also be 1.5% by weight or less, and is preferably 1.0% by weight or less, further preferably 0.8% by weight or less or 0.6% by weight or less.

Nickel (Ni)

Nickel is optionally present and may mainly serve to improve the corrosion resistance.

If present, the amount of Ni is 1.5% by weight or less. The lower limit of the amount of Ni is not specified as it is optional, and may be greater than 0% by weight or 0.1% by weight, but can also be 0.2% by weight.

The upper limit of the amount of Ni is 1.5% by weight, but can also be 1.0% by weight or less. Preferably, the amount of Ni is 0.8% by weight or less or 0.6% by weight or less.

In one preferred embodiment, all of the optional components Si, Mn, Mo and Ni are present. In a preferred aspect of this embodiment, the amount of each of these is 1.0% by weight or less. In one embodiment of this preferred embodiment, the amount of Si is the highest among Si, Mn, Mo and Ni, and is further preferably between 0.7% by weight or higher or 0.8% by weight or higher, but lower than 1% by weight. In such an embodiment, the amount of Mn, Mo and Ni may be each 0.5% by weight or less.

Powder and Powder Manufacture

During its use for forming a coating by a method such as laser cladding or plasma spraying, the alloy may be required to be in powder form.

The method for producing the powder is not particular limited, and suitable methods are well known to a person skilled in the art. Such methods include atomization, e.g. by using water jet milling, or gas atomization.

The powder particles originating from the powder production can be used as such, but may be classified by suitable operations such as sieving in order to eliminate too large or too small particles, e.g. in order to reduce their amount to 2% by weight or less, or to eliminate them completely.

The particles are preferably sieved in order to reduce the content of particles exceeding 250 μm in particle size and particles smaller than 5 μm. The absence or presence of such particles can then be determined by sieve analysis, following e.g. ASTM B214-16.

Alternatively, a skilled person may also employ other means for determining the particle size distribution, using e.g. a laser scattering technique as defined in ISO 13320:2009 and employed for instance by the Mastersizer™ 3000, obtainable from Malvern. Herein, the average diameter Dw90 is preferably from 5 to 250 μm, more preferably from 5 to 200 μm, further preferably from 10 to 100 μm or from 5 to 80 μm. Also in such embodiments, particles exceeding 250 μm may be excluded by sieving, or may be reduced to 2% by weight or less.

In case there should be a discrepancy between a particle size obtained by sieve analysis and a particle size obtained by laser scattering, the laser scattering technique is to be used and prevails.

Wear Resistance and Hardness

Hardness refers to HRC (Rockwell Hardness) determined according to SS ISO 6508-1:2016. The coating has preferably a hardness of 60 HRC or greater, more preferably 62 HRC or greater, further preferably 65 HRC or greater.

Simultaneously with such a hardness, the coating has a wear of 25 mm³ or less, preferably 20 mm³ or less, according to ASTM G65-16, Procedure A.

Substrate and Substrate Bonding

The substrate on which the coating of the present invention is to be provided is not particularly limited, but is in any case a heat resistant inorganic material in order to allow for a deposition process utilizing elevated temperatures of e.g. 250° C. or higher on the substrate surface. The substrate is typically selected from ceramic materials, cermet materials and metallic materials. The metallic material is preferred, and is preferably selected from a metal or a metal alloy. The metal alloy is preferably iron-based, and a particular preferred example includes steel, including stainless steel and tool steel.

In one embodiment, the substrate is made from a metallic material having a lower melting point as the alloy of the invention. This is believed to facilitate the formation of a metallurgical bonding between the coating made from the alloy of the invention and the substrate, as then the powder particles of the alloy hitting the substrate will partially melt or thermally soften the substrate, allowing for a better diffusion of the alloy of the present invention into the substrate and possibly allowing for the formation of a certain metallurgical transition phase between the substrate and the coating.

The presence of a metallurgical bonding between the substrate can be evaluated by examining the transition area between the coating and the substrate in a cross-section of the coated article. Such an observation can be made by a suitable miscroscope. A metallurgical bond present in the transition area between the substrate and the coating preferably gives rise to an X-ray diffraction pattern that is different from the pure substrate and the pure alloy and/or the coating, thereby indicating the formation of a transition phase.

Coating Process

The coated article can be formed by providing a coating of the alloy on the article, and the method for producing is not particularly limited. Preferred methods include a coating forming step employing any one of laser cladding, plasma spraying, plasma powder cladding, or wire arc spraying such as plasma transfer wire arc (PTWA). Yet, in principle any thermal spraying process can be employed, including HVOF.

EXAMPLE

The inventors prepared examples of a powdered alloy having the following compositions (in weight-%), the balance being iron. The alloy powders were laser cladded to form a 1.5 mm thick coating, using a laser with a power of 3.5 kW. The following table provides the results:

| Sample | C | V | Cr | B | Si | Mn | Mo | Ni | HRC |
|---|---|---|---|---|---|---|---|---|---|
| 1 | 1.5 | 2.1 | 5.7 | 0.8 | 0.8 | 0.4 | 0.1 | <0.1 | 66 |
| 2 | 1.8 | 3.0 | 5.5 | 0.8 | 0.8 | 0.4 | 0.2 | 0.2 | 67 |
| 3 | 2.1 | 4.0 | 5.2 | 0.7 | 0.9 | 0.4 | 0.3 | 0.4 | 65 |
| 4 | 2.4 | 5.1 | 5.0 | 0.8 | 0.9 | 0.4 | 0.4 | 0.6 | 67 |
| 5 | 2.7 | 6.1 | 4.7 | 0.8 | 0.9 | 0.4 | 0.6 | <0.1 | 67 |
| 6 | 1.4 | 4.0 | 5.5 | 0.6 | 0.8 | 0.4 | 0.1 | <0.1 | 67 |
| 7 | 1.4 | 3.0 | 5.6 | 0.8 | 0.8 | 0.4 | 0.1 | <0.1 | 66 |
| 8 | 2.2 | 6.1 | 4.9 | 0.7 | 0.8 | 0.4 | 0.5 | <0.1 | 65 |

All coatings exhibited the required hardness and adequate wear resistance.

The invention claimed is:

1. An iron-based alloy, consisting of 3.0-7.0% by weight Cr;

1.3-3.0% by weight C;

0.3-2.0% by weight B;

2.0-10.0% by weight V;

1.5% by weight or less Ni, wherein the content of Ni is greater than 0;

optionally 1.5% by weight or less Si;

optionally 1.0% by weight or less Mn, optionally 2.0% by weight or less Mo;

the balance being Fe and unavoidable impurities.

2. The iron-based alloy according to claim 1, wherein the content of Cr is from 3.2-6.8% by weight.

3. The iron-based alloy according to claim 1, wherein the content of B is from 0.3-1.2% by weight.

4. The iron-based alloy according to claim 1, wherein the content of Ni is greater than 0 and is 1.0% by weight or less.

5. The iron-based alloy according to claim 1, wherein the content of Mo is greater than 0.

6. The iron-based alloy according to claim 1, wherein the content of V is from 4.0 to 8.0% by weight.

7. The iron-based alloy according to claim 1, wherein the content of C is from 1.5-2.8% by weight.

8. The iron-based alloy according to claim 1, wherein the content of the optional components Si, Mn, and Mo is each 1.0% by weight or less.

9. An article having a substrate and a coating, the coating being formed from an iron-based alloy as defined in claim 1.

10. The article according to claim 9, wherein the substrate is made of a metal or metal alloy.

11. Article according to claim 9, which is a hydraulic cylinder or roller used in the mining or steel industry.

12. The article according to claim 11, wherein the coating has both
    a hardness of 60 HRC or greater as measured by SS-EN ISO 6508-1:2016; and
    a wear of 25 $mm^3$ or less according to ASTM G65-16, Procedure A.

13. The article according to claim 9, wherein the coating is formed by laser cladding, plasma powder cladding or plasma transfer arc, wherein the content of the optional components Si, Mn, and Mo is each 1.0% by weight or less in the iron-based alloy powder.

14. The iron-based alloy according to claim 1, which is in powder form.

15. A method of forming a coating on a substrate with the iron-based alloy according to claim 1.

16. An iron-based alloy, consisting of
    3.0-7.0% by weight Cr;
    1.3-3.0% by weight C;
    0.3-2.0% by weight B;
    2.0-10.0% by weight V;
    optionally 1.5% by weight or less Si;
    optionally 1.0% by weight or less Mn,
    optionally 2.0% by weight or less Mo;
    optionally 1.5% by weight or less Ni;
    the balance being Fe and unavoidable impurities,
    wherein the iron-based alloy is in powder form.

17. The iron-based alloy according to claim 16, wherein the powder contains no or less than 2% by weight of particles having a particle size exceeding 250 μm as measured by sieve analysis according to ASTM B214-16.

18. The iron-based alloy in powder form according to claim 16, which consists of particles having a particle size between 5-200 μm as measured by sieve analysis according to ASTM B214-16.

19. The iron-based alloy in powder form according to claim 16, which consists of particles having a particle size between 20-200 μm as measured by sieve analysis according to ASTM B214-16.

20. A method for forming a coated article, comprising the steps of
    providing a substrate, and
    forming a coating on the substrate,
    wherein the step of forming the coating utilizes an alloy powder as defined in claim 16.

21. The method for forming a coated article according to claim 20, wherein the step of forming a coating is a laser cladding step, a plasma powder cladding step, a plasma transfer arc step or a HVOF step.

22. The method for forming a coated article according to claim 20, wherein the article is a hydraulic cylinder or roller used in the mining or steel industry.

* * * * *